US008755779B1

(12) United States Patent
Burks et al.

(10) Patent No.: US 8,755,779 B1
(45) Date of Patent: Jun. 17, 2014

(54) SYSTEMS AND METHODS FOR CLAIMS PROCESSING VIA MOBILE DEVICE

(75) Inventors: Rickey Dale Burks, Boerne, TX (US); Charles L. Oakes, III, Boerne, TX (US); Michael P. Bueche, Jr., San Antonio, TX (US); Bradly Jay Billman, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 758 days.

(21) Appl. No.: 12/180,119

(22) Filed: Jul. 25, 2008

(51) Int. Cl.
*H04W 4/00* (2009.01)

(52) U.S. Cl.
USPC ........................................ 455/414.3; 455/404

(58) Field of Classification Search
USPC ........... 455/414.1–414.3, 404, 418; 705/4, 37
See application file for complete search history.

(56) References Cited

U.S. PATENT DOCUMENTS

| | | | |
|---|---|---|---|
| 5,950,169 A | 9/1999 | Borghesi et al. | |
| 6,898,574 B1 | 5/2005 | Regan | |
| 6,972,669 B2 * | 12/2005 | Saito et al. | 340/438 |
| 7,203,654 B2 | 4/2007 | Menendez | |
| 7,263,493 B1 | 8/2007 | Provost et al. | |
| 7,313,759 B2 | 12/2007 | Sinisi | |
| 7,469,215 B2 * | 12/2008 | Kwan | 705/4 |
| 8,019,629 B1 * | 9/2011 | Medina et al. | 705/4 |
| 8,260,639 B1 * | 9/2012 | Medina et al. | 705/4 |
| 2002/0035488 A1 | 3/2002 | Aquila et al. | |
| 2002/0055861 A1 * | 5/2002 | King et al. | 705/4 |
| 2002/0115423 A1 | 8/2002 | Hatae et al. | |
| 2003/0120588 A1 | 6/2003 | Dodd et al. | |
| 2004/0030587 A1 | 2/2004 | Danico et al. | |
| 2004/0148204 A1 | 7/2004 | Menendez | |
| 2004/0166828 A1 * | 8/2004 | Yosioka | 455/344 |
| 2004/0186750 A1 | 9/2004 | Surbey et al. | |
| 2004/0198441 A1 * | 10/2004 | Cooper et al. | 455/557 |
| 2005/0176403 A1 * | 8/2005 | Lalos | 455/404.1 |
| 2005/0222947 A1 | 10/2005 | Regan | |

(Continued)

FOREIGN PATENT DOCUMENTS

JP 2005057343 3/2005

OTHER PUBLICATIONS

J. Mylopoulos et al., Tropos: A Framework for Requirements-Driven Software Development, [Retrieved on May 13, 2008] Retrieved from the Internet at URL < http://www.cs.toronto.edu/~mkolp/tropos1.pdf>.

(Continued)

*Primary Examiner* — Kashif Siddiqui
*Assistant Examiner* — Khawar Iqbal
(74) *Attorney, Agent, or Firm* — Baker and Hostetler LLP

(57) ABSTRACT

A method, system and computer-usable medium are disclosed for the processing of information collected by a mobile device at the site of an incident. An incident information processing system, comprising an incident location information module, receives incident information provided in a communication originated from a mobile device. The received incident information is processed by the incident location information module to provide location information, which is then used to provide incident response services. Image and audio information relating to the incident are likewise provided by the mobile device for processing into incident information. Incident statement questions are generated by the incident information processing system and are then presented via the mobile device for response by various parties associated with the incident. Responses to the questions are collected via the mobile device, processed into incident statements, and stored in the incident information and claims repository.

15 Claims, 16 Drawing Sheets

(56) References Cited

U.S. PATENT DOCUMENTS

| | | |
|---|---|---|
| 2005/0273368 A1 | 12/2005 | Hutten et al. |
| 2006/0116913 A1 | 6/2006 | Hansan et al. |
| 2006/0218018 A1 | 9/2006 | Schmitt |
| 2007/0100669 A1 | 5/2007 | Wargin et al. |
| 2007/0179818 A1 | 8/2007 | Magnus |
| 2007/0226018 A1 | 9/2007 | Gross et al. |
| 2008/0052134 A1* | 2/2008 | Nowak et al. ............... 705/4 |
| 2008/0184272 A1* | 7/2008 | Brownewell ............... 719/318 |
| 2008/0235040 A1* | 9/2008 | Ratliff et al. ............... 705/1 |
| 2008/0255754 A1* | 10/2008 | Pinto ............... 701/119 |
| 2009/0117923 A1 | 5/2009 | Berger et al. |
| 2009/0131090 A1* | 5/2009 | Jo et al. ............... 455/466 |
| 2010/0138242 A1* | 6/2010 | Ferrick et al. ............... 705/4 |
| 2010/0145734 A1* | 6/2010 | Becerra et al. ............... 705/4 |
| 2010/0222031 A1* | 9/2010 | Carolan et al. ............... 455/414.1 |

OTHER PUBLICATIONS

"U.S. Appl. No. 12/180,196 Non-Final Office Action mailed Oct. 8, 2010", 9 pgs.

"U.S. Appl. No. 12/180,196, Final Office Action mailed Apr. 15, 2011", 10 pgs.

"U.S. Appl. No. 12/180,196, Response filed Feb. 8, 2011 to Non Final Office Action mailed Oct. 8, 2010", 13 pgs.

\* cited by examiner

SYSTEMS AND METHODS FOR CLAIMS PROCESSING VIA MOBILE DEVICE

CROSS REFERENCE TO RELATED APPLICATIONS

U.S. patent application Ser. No. 12/180,048, entitled "Systems and Methods for claims Processing via Mobile Device," inventors Rickey Dale Burks, Charles L. Oakes, III, Michael P. Bueche, Jr., and Bradly Jay Billman, filed on Jul. 25, 2008, describes exemplary methods and systems and is incorporated by reference in its entirety.

U.S. patent application Ser. No. 12/180,196, entitled "Systems and Methods for claims Processing via Mobile Device," inventors Rickey Dale Burks, Charles L. Oakes, III, Michael P. Bueche, Jr., and Bradly Jay Billman, filed on Jul. 25, 2008, describes exemplary methods and systems and is incorporated by reference in its entirety.

BACKGROUND

1. Field of the Disclosure

Embodiments of the disclosure relate in general to the field of computers and similar technologies, and in particular to software utilized in this field. Still more particularly, it provides a system, method, and computer-usable medium for the processing of information collected by a mobile device at the site of an incident.

2. Description of the Related Art

Being involved in an accident of any kind can be traumatic, with reactions ranging from poor concentration, nervousness, anxiety, irritability, to agitation, or even being in a state of shock. As a result, the scene of an accident can be confusing to all involved. In some cases, it is even difficult to determine the actual location of the accident. The inability to determine the location of an accident can not only hamper first responder efforts, such as emergency medical services, but it can also introduce delays in the provision of other incident response services, such as providing wrecker service or rental vehicles.

In addition, recalling what was seen and said, by who, in what context, can prove problematic under the best of circumstances, much less the scene of an accident. Witnesses' memories fade as time passes, and the details of the accident become vague. In some cases, a witness may even begin to rationalize what they believe they may or may not have witnessed. Each accident scene investigator has their own priorities, which are reflected in the manner, and context, of their documentation. All too often, insurance claims investigators and adjusters review the scene well after the fact and much of the evidence related to the accident is no longer available. In other cases, witnesses can no longer be located and the possibility of obtaining a statement of any kind is lost. As a result, not only is the responsiveness and effectiveness of incident response services hampered, but the comprehensiveness, accuracy and timeliness of insurance claim settlements as well.

The use of mobile communication devices has become pervasive in recent years, and while their features and functionality continue to grow, they have also become simpler to use. In fact, it has now become commonplace for even unsophisticated mobile phone users to use their camera phones to capture events and send them to a recipient. Mobile device users involved in an accident are no exception and it is not unusual for multiple parties to document the site and details of the incident. However, transferring the incident information collected by these mobile devices to the insurer is more problematic. In some cases, an insured or claimant can provide incident information related to an accident as part of an on-line claims process. In other cases, the incident information can be attached to an email. More likely, the incident information is produced in a physical format and provided manually, or worse, not at all. In view of the foregoing, there is a need for the user of a mobile device to submit location, image, audio, and other related information from the scene of an accident to improve the responsiveness of incident response services and the accuracy and timeliness of insurance claim settlements.

BRIEF SUMMARY

A method, system, and computer-usable medium are disclosed for processing of information collected by a mobile device at the site of an incident. In various embodiments, an incident information processing system, comprising an incident information module, is implemented to process information relating to an incident. The incident information is provided by an insured or other parties using one or more mobile devices. In these and other embodiments, the incident information is conveyed directly or indirectly from the mobile devices to the incident information processing system through one or more network connections. In one embodiment, the conveyed incident information is stored in an incident information and claims repository, where it is used to process claims against one or more insurance policies providing coverage for an insured associated with an incident.

Once identified, user and policy information relating to the insured is retrieved from the user and policy information repository and is used to provide incident response services. In one embodiment, insurance policy information related to the insured's coverage is retrieved from the user and policy information repository and used by the incident information processing system to determine the insured's coverage when fulfilling requested incident response services. In another embodiment, the insured's financial account information is stored in the user and policy information repository and is operable to be used by the incident information processing system on behalf of the insured to fulfill requested incident response services.

In various embodiments, the mobile device is operable to collect statements from an insured and other parties associated with an incident. In one embodiment, the incident information processing system generates a first set of statement questions, based on existing incident information, for the insured. In another embodiment, the first set of questions is presented to another party associated with incident. In various embodiments the status of the other party may be an insured, a witness, a claimant, or a responder to the incident. In yet another embodiment, a second set of statement questions is generated for the other party, based on existing incident information. In still another embodiment, a third set of questions, based on the status of the other party and the responses to the first set of questions by the insured, is presented to the other party. In another embodiment, a fourth set of questions, based on the status of the other party and the responses to the first set of questions by the other party, is presented to the other party. In these and other embodiments, the responses to the first, second, third, and fourth sets of questions are associated with an incident report and stored in the incident information and claims repository.

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION

Figure 1:
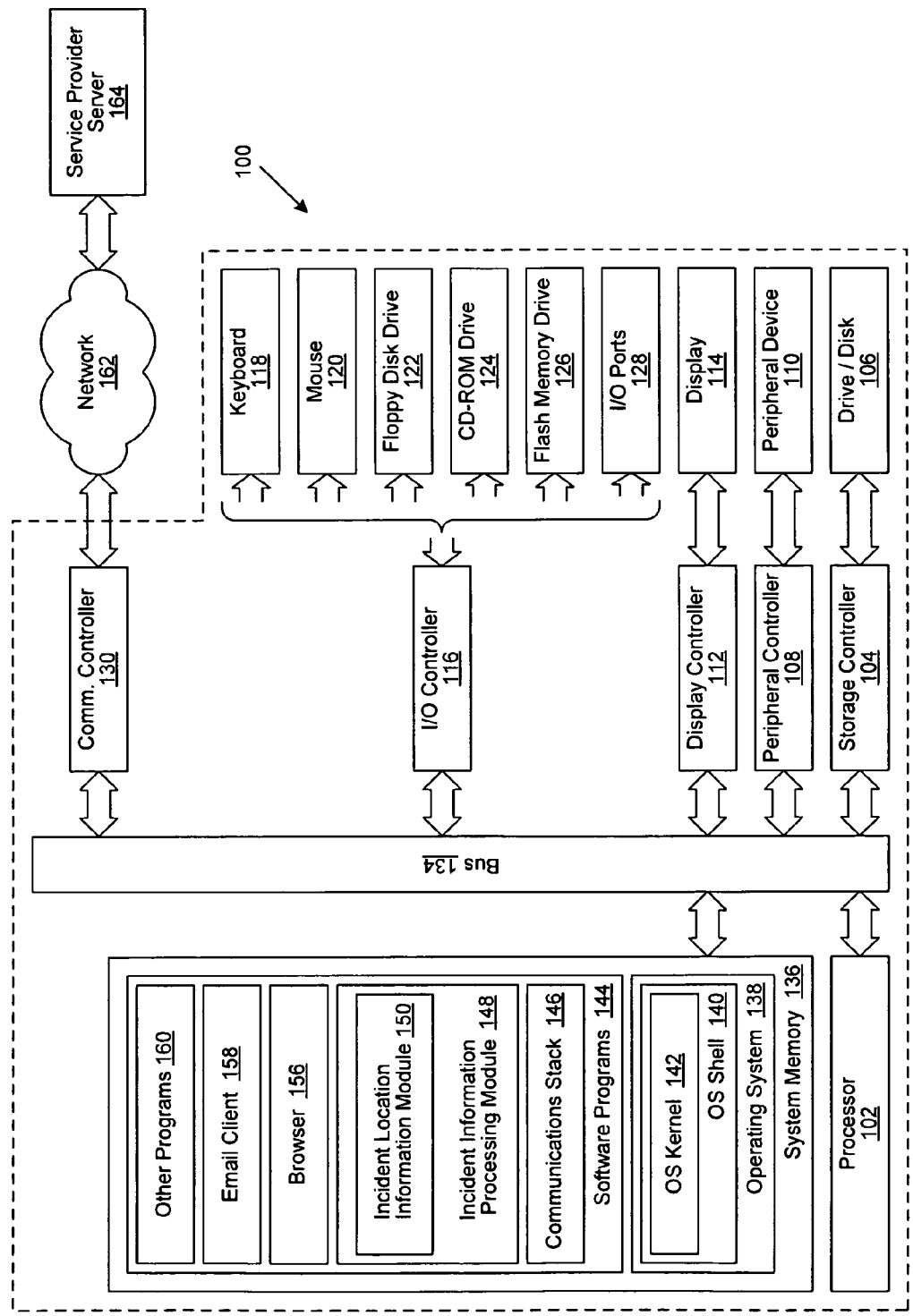
FIG. 1 depicts an exemplary client information processing system (IPS) in which embodiments of the disclosure may be implemented.

A method, system and computer-usable medium are disclosed for the collecting and processing of information at the site of an incident by a mobile device. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments of the disclosure can be implemented. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller) 16 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a consolidated purchase, payment, and billing system 148. The incident information processing module 148 includes code for implementing the processes described in FIGS. 2-6 described hereinbelow. In various embodiments, the incident information processing module 148 further comprises an incident location information module 150. In one embodiment, client IPS 100 is able to download consolidated purchase, payment, and billing system 148 from a service provider server 164.

The hardware elements depicted in client IPS 100 are not intended to be exhaustive, but rather are representative to highlight components used in the disclosed systems and methods. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
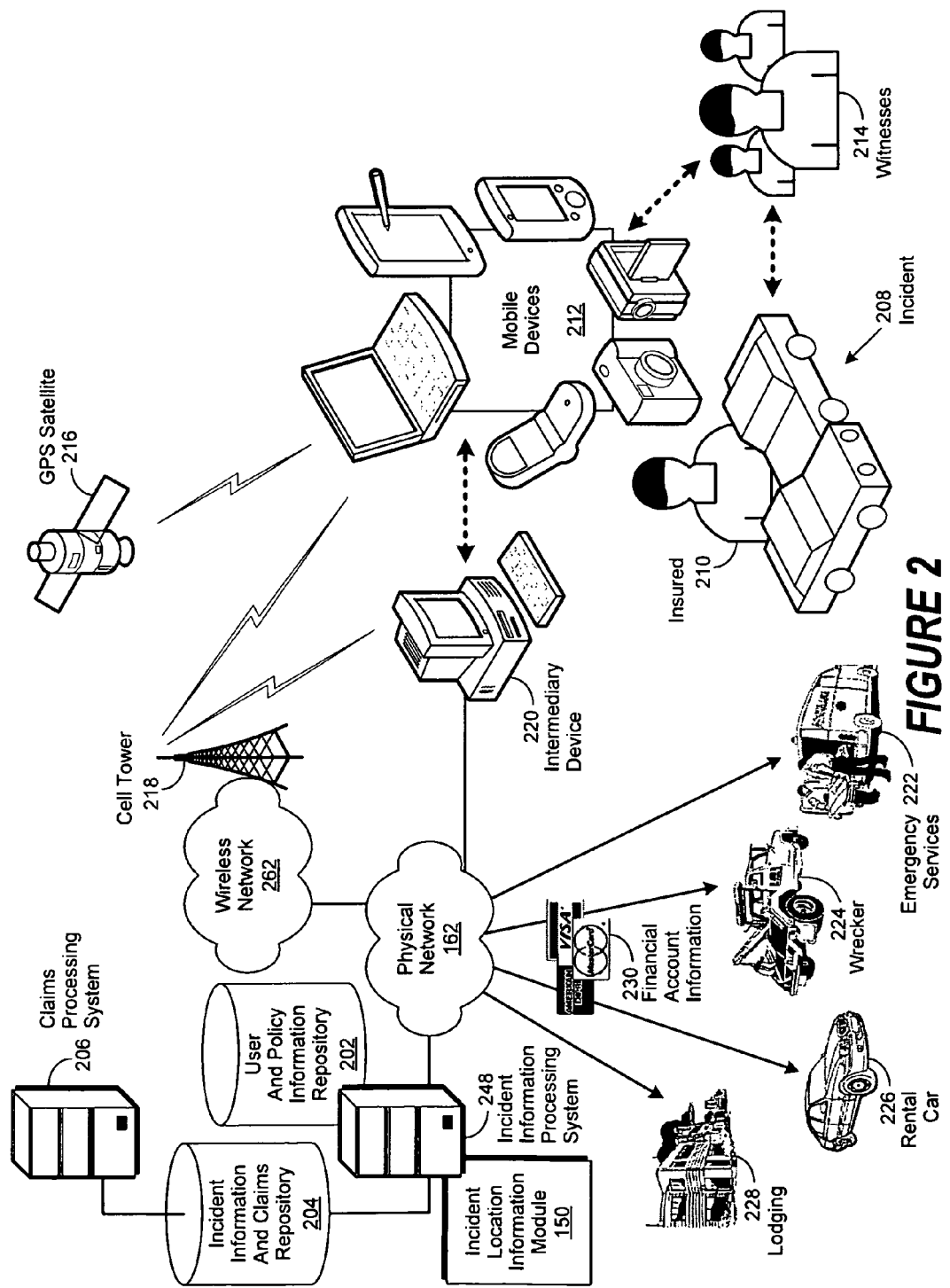
FIG. 2 is a simplified block diagram of an incident information processing system as implemented in accordance with an embodiment of the disclosure.
Figure 3A:
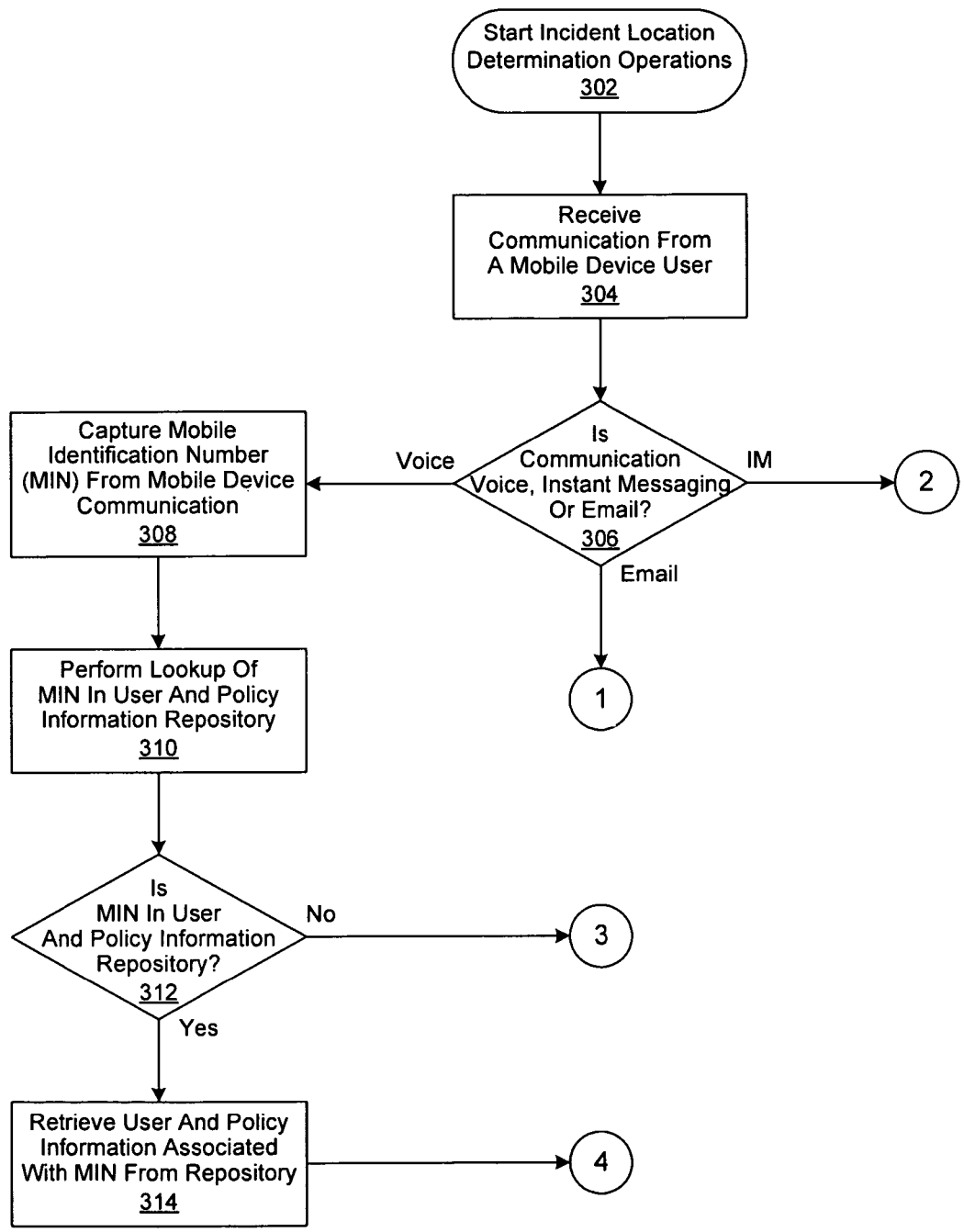
FIGS. 3a-e are a generalized flowchart of the operation of an incident information processing system as implemented with a mobile device to determine the location of an incident.
Figure 3B:
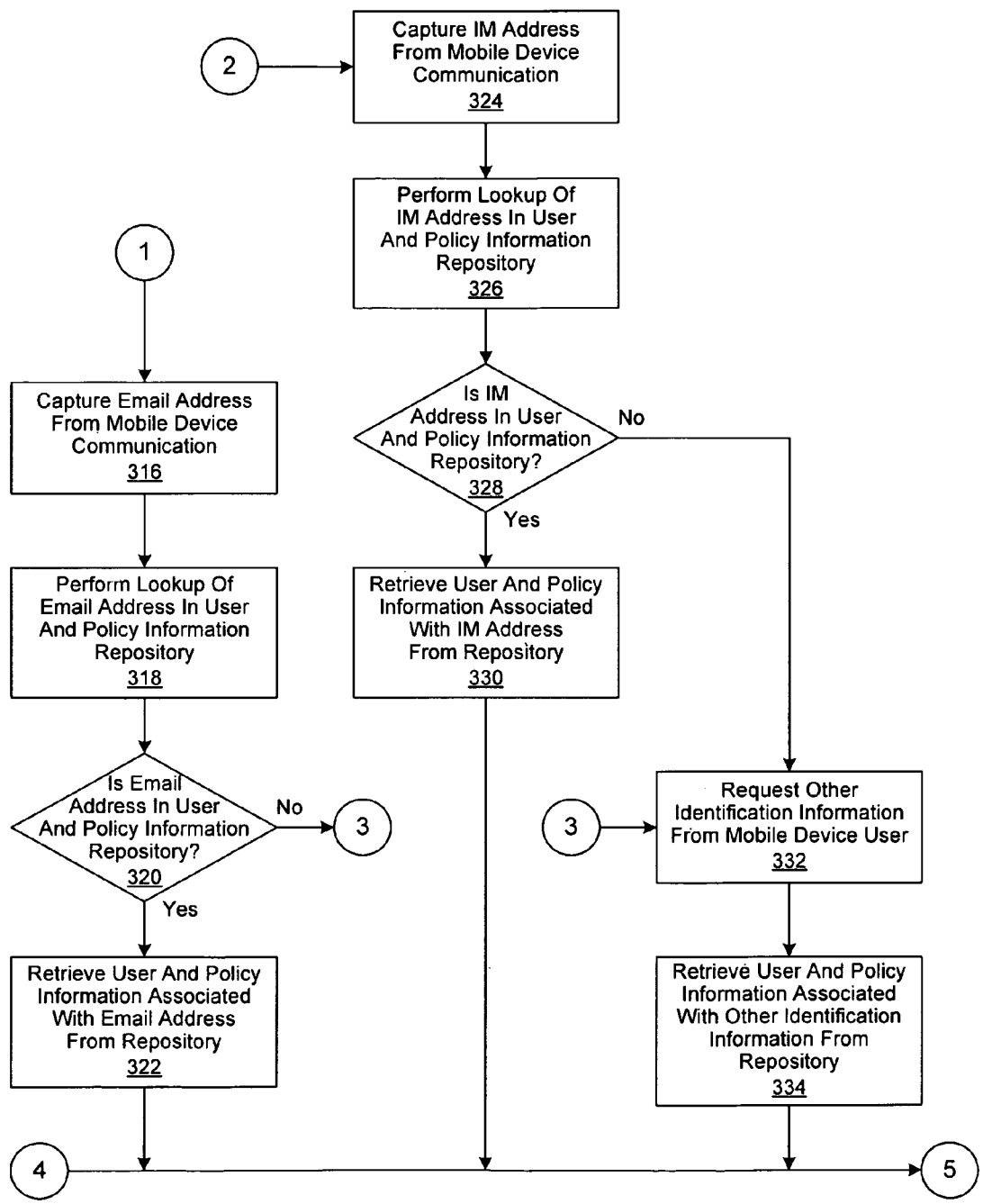
Figure 3C:
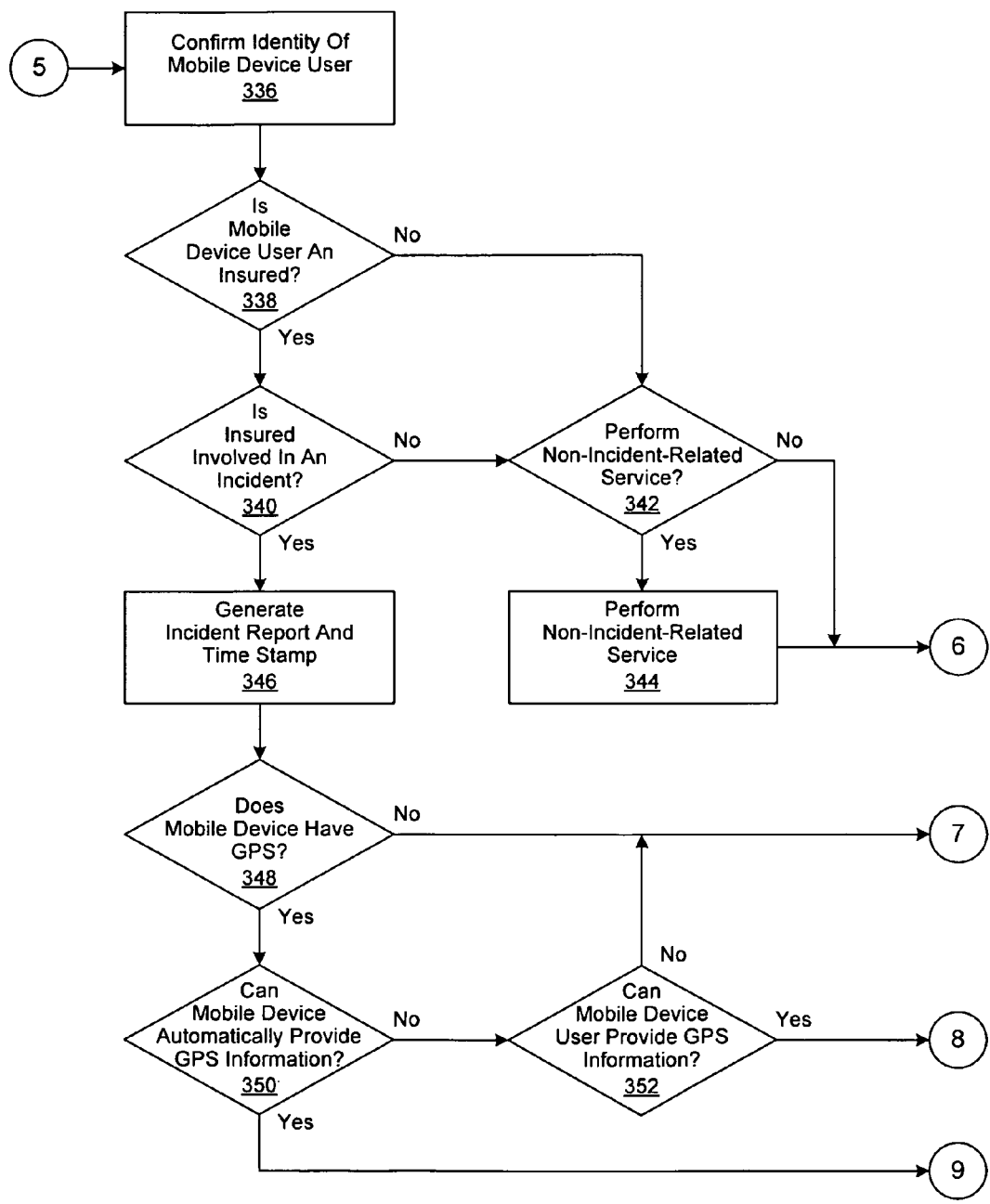
Figure 3D:
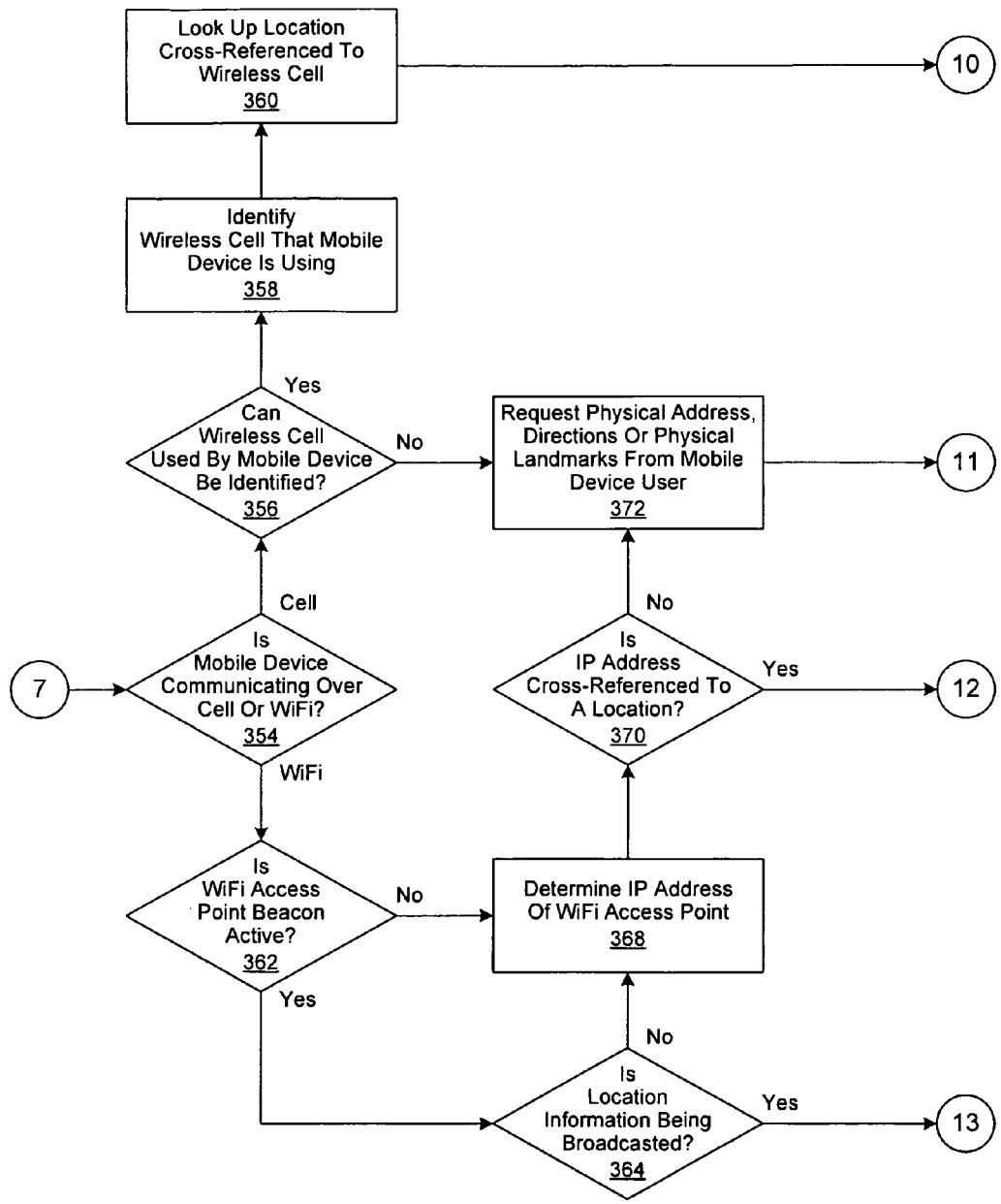
Figure 3E:
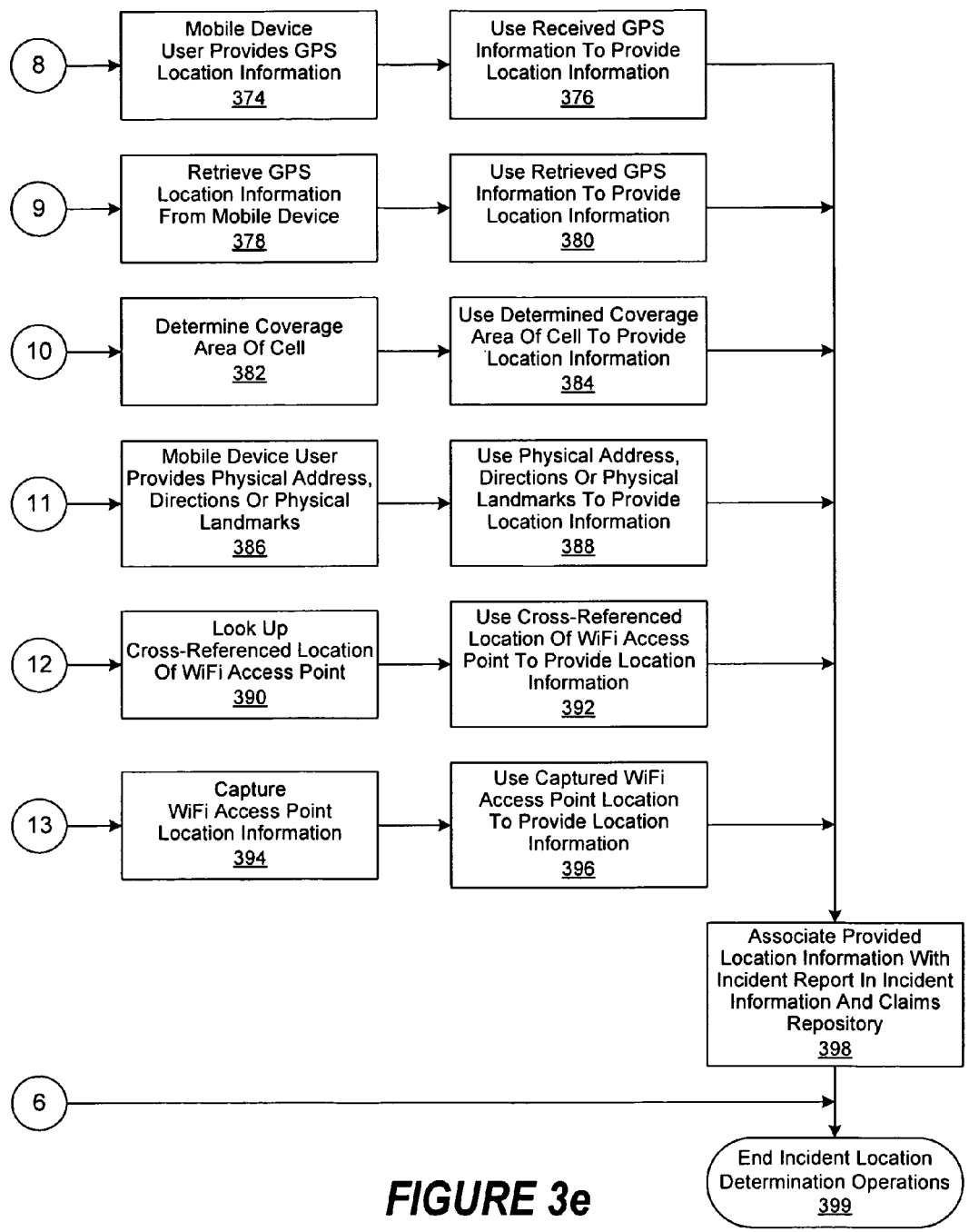

FIG. 2 is a simplified block diagram of an incident information processing system as implemented in accordance with embodiments of the disclosure.

In various embodiments, an incident information processing system 248, comprising incident information module 150, is implemented to process information relating to an incident 208. The incident information is provided by an insured 210, or other parties such as witnesses 214, using one or more mobile devices 212. In these and other embodiments, the incident information is conveyed directly from the mobile devices 212 to the incident information processing system 248, through one or more connections through a network, such as wireless network 262 or physical network 162. In another embodiment the incident information is conveyed indirectly from the mobile devices 212 to the incident information processing system 248 through an intermediary device 220, such as a stationary computer with a connection to physical network 162. In various embodiments, the conveyed incident information is received by the incident information processing system 248 and stored in the incident information and claims repository 204. In one embodiment, the claims processing system 206 uses the conveyed incident information stored in the incident information and claims repository 204 to process claims against one or more insurance policies providing coverage for the insured 208.

In one embodiment, a communication originated by insured 210 is received by the incident information processing system 248 from a mobile device 212. In various embodiments, the communication may be in the form of a voice call, an instant message, or an electronic mail (email) message. In one embodiment, mobile device 212 comprises a GPS system operable to receive GPS signals from GPS satellite 216. Using the GPS system, the mobile device 202, directly or indirectly with the assistance of insured 210, can provide GPS information to the incident information processing system 248. The incident location information module 150 can then process the GPS information to provide location information relating to incident 208 to the incident information processing system 248. In another embodiment, information relating to cell tower 218 is conveyed by the mobile device 212 to the incident information processing system 248. The cell tower information is then processed by the incident location information module 150 to provide location information relating to incident 208.

In various embodiments, insured 210 is automatically identified when one or more mobile devices 212 are used when communicating the incident information processing system. In one embodiment, the insured 210 is identified by the mobile identification number (MIN) associated with a mobile device 212. In another embodiment the insured 210 is identified by the email address used to originate the communication with the incident information processing system. In yet another embodiment, the insured 210 is identified by the instant messaging (IM) address used to originate the communication with the incident information processing system. Once identified, user and policy information relating to insured 210 is retrieved from the user and policy information repository 202.

In various embodiments, the user and policy information relating to insured 210 is used to provide incident response services to the insured 210. As an example, incident response services may include emergency services 222, wrecker services 224, rental car 226, or lodging 228. It will be appreciated that many other such incident response services may be provided by the incident information processing system, which uses the location information received from the mobile devices in the fulfillment of these services. In one embodiment, insurance policy information related to the insured's 210 coverage is stored in the user and policy information repository 202. This information is retrieved and used by the incident information processing system to determine the insured's 210 coverage when fulfilling requested incident response services. In another embodiment, the insured's financial account information 230 is stored as user information in the user and policy information repository 202. In one embodiment, the incident information processing system 248 is operable to use the stored financial account information 230 on behalf of insured 210 to fulfill requested incident response services not fully covered by the insured's 210 insurance policies.

In various embodiments, the mobile device 212 is operable to be used to receive statements from various parties, such as the insured 210 and witnesses 214, associated with the incident 208. In one embodiment, the incident information processing system 248 generates a first set of questions, based on existing incident information, for the insured 210. In another embodiment, the first set of questions is presented to the other party associated with incident 208. In various embodiments the status of the other party may be an insured 210, a witness 214, a claimant, or a responder to the incident. In yet another embodiment, a second set of questions is generated for the other party, based on existing incident information. In still another embodiment, a third set of questions, based on the status of the other party and the responses to the first set of questions by the insured 210, is presented to the other party associated with incident 208. In another embodiment, a fourth set of questions, based on the status of the other party and the responses to the first set of questions by the other party, is presented to the other party associated with incident 208. In these and other embodiments, the responses to the first, second, third, and fourth sets of questions are associated with an incident report and stored in the incident information and claims repository 204.

FIGS. 3*a-e* are a generalized flowchart of the operation of an incident information processing system as implemented with a mobile device in one embodiment to determine the location of an incident. In this embodiment, incident location determination operations are begun in block 302, followed by the receipt of a communication from a mobile device user in block 304. In block 306, a determination is made whether the communication is in the form of a voice call, an instant message, or an electronic mail (email) message. If it is determined in block 306 that the communication is in the form of a voice call, then the mobile identification number (MIN) or the mobile device originating the voice call is captured in block 308. Those of skill in the art will be familiar with an MIN, which is the wireless equivalent of an automatic number identification (ANI) used in wireline calls for identifying the originating wireline number of a voice call. As such, it provides the phone number typically associated with a mobile device that is operable to initiate a wireless communications session.

In block 314, a look-up of the MIN is performed within a user and policy information repository. As used herein, the user and policy information repository is typically implemented as a physical, distributed, logically unified, or federated database of user and insurance policy information. In various embodiments, users are insured individuals (insureds) whose coverage is provided by associated policies. The associations between the users, or insureds, and their respective insurance policies are maintained, directly or indirectly, by the user and policy information repository. In various embodiments, the user and policy information repository may also contain other information, such as financial account and personal profile information associated with the users. As an example, personal profile information may include wireline and wireless phone numbers, or MINs and ANIs, respectively, that are associated with a user. In one embodiment, the MIN or ANI associated with a user is implemented as an index to link a user to their associated insurance policies. Accordingly, a determination is made in block 312 whether the MIN captured in block 308 is present in the user and policy information repository. If so, then user and insurance policy information indexed to the MIN is retrieved in block 314.

However, if it is determined in block 306 that the communication received from the mobile device is an email, then the email address that originated the mobile device communication is captured in block 316. A look-up operation is then performed in block 318 against the user and policy information repository to search for the email address. A determination is then made in block 320 whether the email address is present, or used as an index to a user's insurance policy information, in the user and policy information repository. If so, then user and insurance policy information associated with, or indexed to, the email address is retrieved in block 322.

However, if it is determined in block 306 that the communication received from the mobile device is an instant message (IM), then the IM address that originated the mobile device communication is captured in block 324. A look-up operation is then performed in block 326 against the user and policy information repository to search for the IM address. A determination is then made in block 328 whether the IM address is present, or used as an index to a user's insurance policy information, in the user and policy information repository. If so, then user and insurance policy information associated with, or indexed to, the email address is retrieved in block 330.

However, if it is respectively determined in blocks 312, 320, and 328 that the MIN, email address, or IM address are not present in the user and policy information repository, then other identification information is requested from the mobile device user in block 332. Once provided, user and insurance policy information associated with the other provided identification information is retrieved from the user and policy information repository in block 334. Once the associated user and insurance policy information has been retrieved from the user and policy information repository in blocks 314, 322, 330 or 334, the identity of the mobile device user is confirmed in block 336. For example, the user may be asked to provide their date of birth, their Social Security Number, or other unique information that only they would typically know.

Once their identity is confirmed, a determination is made in block 338 whether the user of the mobile device is an insured of an insurance policy whose associated information resides in the user and policy information repository. If not, then a determination is made in block 342 whether the user of the mobile device is requesting a non-incident-related service. If not, then incident location determination operations are ended in block 399. As an example, a user of a mobile device may have mistakenly called an insurer, erroneously believing the insurer to be their insurance provider. Otherwise, the non-incident-related service is performed in block 344 and then incident location determination operations are ended in block 399. For example, an insured may have miss-keyed their response to a call routing system and then were rerouted to the appropriate destination.

However, if it is determined in block 338 that the user of the mobile device is an insured, then a determination is made in block 340 whether the insured is involved in an incident. If not, then the process continues as before, proceeding with block 342. Otherwise, an incident report is generated in block 346 and then time and date stamped. A determination is then made in block 348 whether the mobile device has geographic positioning system (GPS) capabilities. If so, then a determination is made in block 350 whether the mobile device can automatically provide GPS information to the incident information processing system. If so, then GPS information is automatically retrieved from the mobile device by the incident information processing system in block 378. The automatically retrieved GPS information is then used by the incident information processing system in block 380 to provide location information relating to the location of the mobile device, and by extension, the user of the mobile device. The provided location information is then associated in block 398 with the previously generated incident report in the incident information and claims repository. Incident location determination operations are then ended in block 399.

However, if it is determined in block 350 that the mobile device cannot automatically provide GPS information, then a determination is made in block 352 whether the user of the mobile device can manually provide GPS information to the incident information processing system. If so, then GPS information is manually retrieved from the mobile device by the user and then provided to the incident information processing system in block 374. The manually retrieved and provided GPS information is then used by the incident information processing system in block 376 to provide location information relating to the location of the mobile device, and by extension, the user of the mobile device. The provided location information is then associated in block 398 with the previously generated incident report in the incident information and claims repository. Incident location determination operations are then ended in block 399.

However, if it is determined in block 348 that the mobile device does not have GPS capabilities, or in block 352 that GPS information cannot be manually retrieved from the mobile device, then a determination is made in block 354 whether the mobile device is communicating over a cellular or Ethernet 802.11 (WiFi) network. If it is determined in block 354 that the mobile device is communicating over a cellular network, then a determination is made in block 356 whether the network cell being used by the mobile device can be identified. If so, then the network cell the mobile device is using is identified in block 358. A look-up operation is then performed in block 360 to cross-reference the identifier of the network cell to a physical location. The coverage area of the identified network cell is then determined in block 382 and then used in block 384 to provide location information relating to the location of the mobile device, and by extension, the user of the mobile device. The provided location information is then associated in block 398 with the previously generated incident report in the incident information and claims repository. Incident location determination operations are then ended in block 399.

However, if it is determined in block 356 that the network cell the wireless device is using cannot be identified, then the mobile user is asked to provide a physical address, directions, or physical landmarks in block 372. The mobile user then provides a physical address, directions, or physical landmarks in block 386 which are used in block 388 to provide location information relating to the location of the mobile device, and by extension, the user of the mobile device. The provided location information is then associated in block 398 with the previously generated incident report in the incident information and claims repository. Incident location determination operations are then ended in block 399.

However, if it is determined in block 354 that the mobile device is communicating over an Ethernet 802.11 (WiFi) network, then a determination is made in block 362 whether the beacon feature of the WiFi access point being used by the mobile device is active. Those of skill in the art will be familiar with WiFi beacons, which announce their presence, and corresponding wireless network availability, to WiFi-enabled devices. It has become common in recent years to populate these WiFi beacons with supplemental information, such as address or location information. Since the effective range of a WiFi access point typically does not exceed 200 meters, such location information can be useful when attempting to determine the location of a mobile device. Accordingly, if it is determined in block 362 that the beacon feature of the WiFi access point being used by the mobile device is active, then a determination is then made in block 364 whether address or location information is contained within the beacon. If so, then the address or location information contained within the beacon is captured in block 394 and used in block 396 to provide location information relating to the location of the mobile device, and by extension, the user of the mobile device. The provided location information is then associated in block 398 with the previously generated incident report in the incident information and claims repository. Incident location determination operations are then ended in block 399.

However, if it is determined in block 362 that the beacon of the WiFi access point being used by the mobile device is not active, or in block 364 that the beacon is active but not broadcasting location information, then the IP address of the WiFi access point is determined in block 368. A determination is then made in block 370 whether the IP address of the WiFi access point is cross-referenced to a physical location, such as in a network address table used for facilities management. If so, then a look-up operation is performed in block 390 to determine the cross-referenced physical location. The cross-referenced physical location is then used in block 392 to provide location information relating to the location of the mobile device, and by extension, the user of the mobile device. The provided location information is then associated in block 398 with the previously generated incident report in the incident information and claims repository. Incident location determination operations are then ended in block 399.

However, if it is determined in block 370 that the IP address of the WiFi access point is not cross-referenced to a physical location, then the mobile user is asked to provide a physical address, directions, or physical landmarks in block 372. The mobile user then provides a physical address, directions, or physical landmarks in block 386 which are used in block 388 to provide location information relating to the location of the mobile device, and by extension, the user of the mobile device. The provided location information is then associated in block 398 with the previously generated incident report in the incident information and claims repository. Incident location determination operations are then ended in block 399.

Figure 4A:
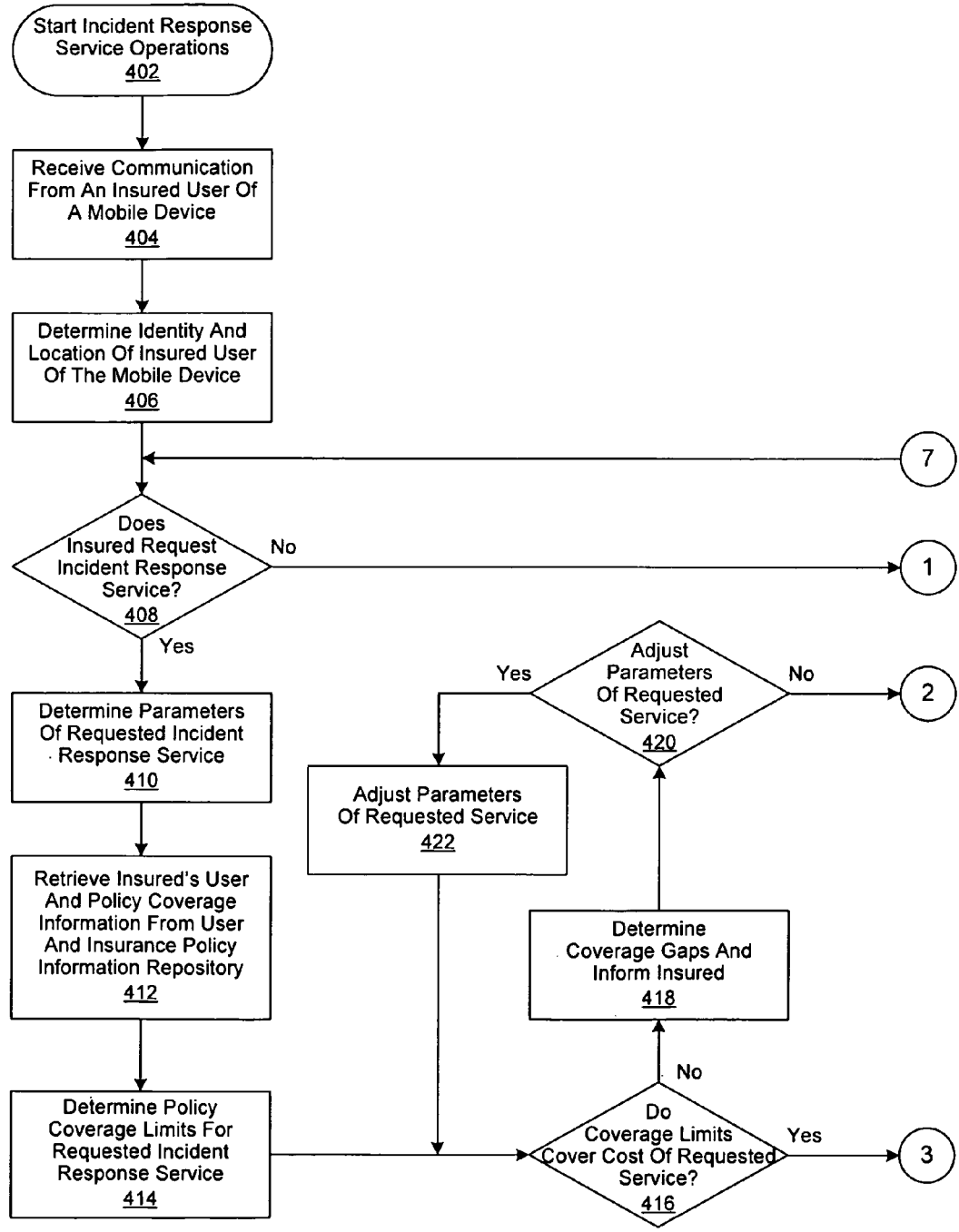
FIGS. 4a-c are a generalized flowchart of the operation of an incident information processing system as implemented with a mobile device to provide a response to an incident.
Figure 4B:
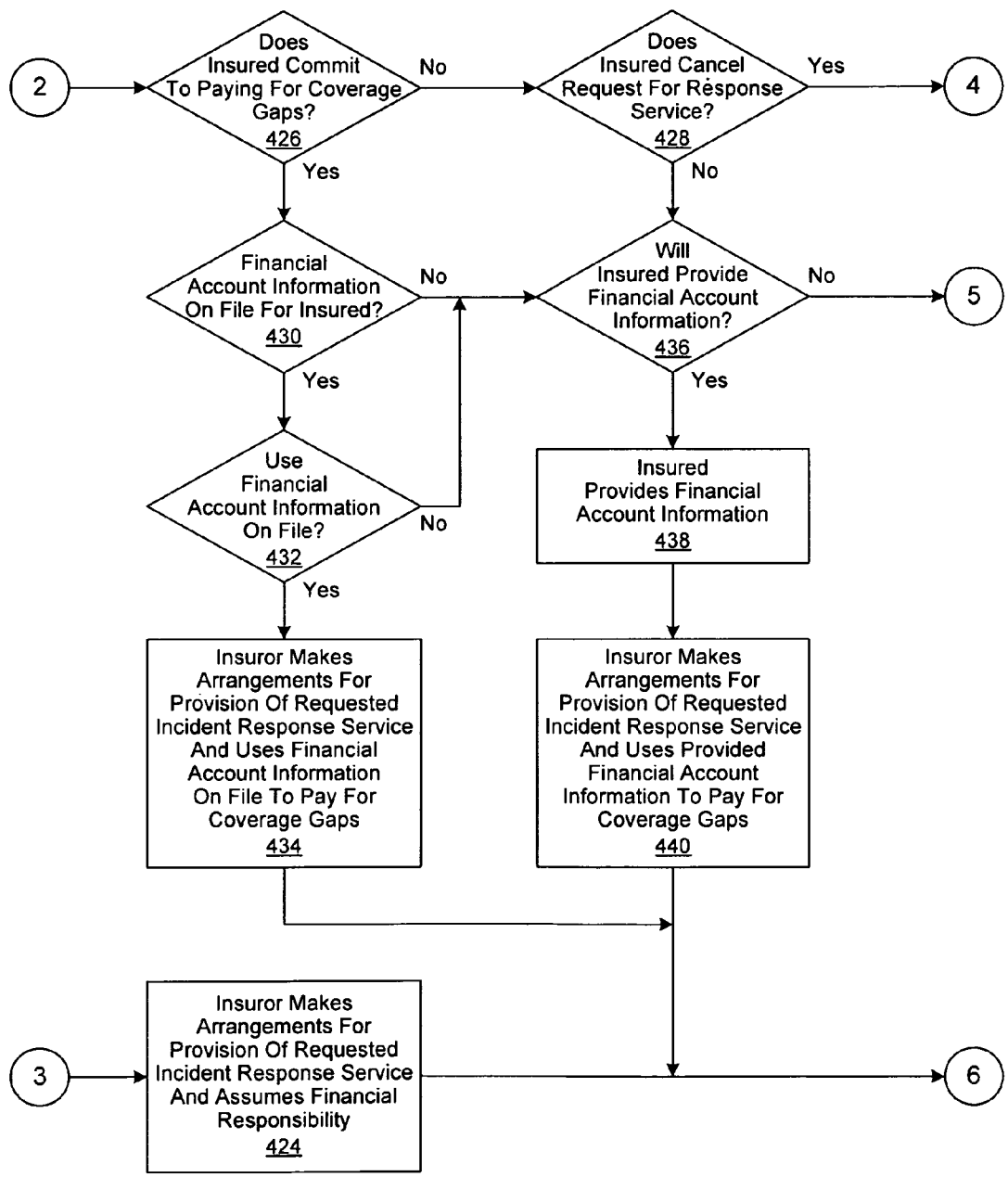
Figure 4C:
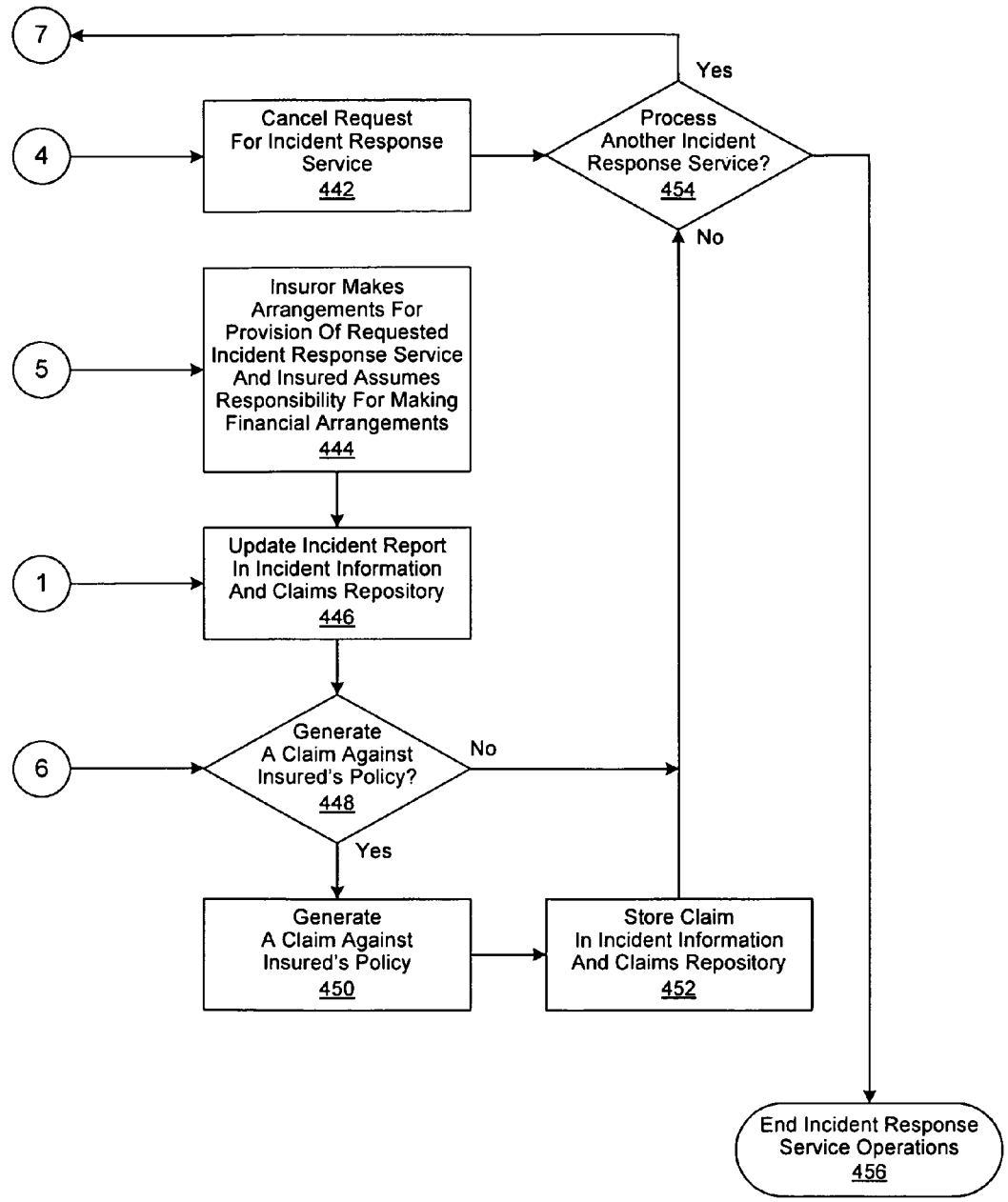

FIGS. 4a-c are a generalized flowchart of the operation of an incident information processing system as implemented with a mobile device in an embodiment to provide a response to an incident. In this embodiment, incident response service operations are begun in block 402 followed by the receipt of a communication from an insured user of a mobile device user in block 406. The identity and location of the insured are then determined in block 406 as described in greater detail herein. A determination is then made in block 408 whether the insured is requesting an incident response service. As used herein, an incident response service is defined as any service, or combination of services, that are provided in response to the occurrence of an incident. As an example, if an insured is involved in an automobile accident incident, then the insured may request the dispatch of an automobile wrecker as an incident response service. As another example, if the insured is out of town, and their vehicle is a total loss as a result of the accident, they may request the dispatch of a rental vehicle, as well as reservations for local lodging. It will be apparent to those of skill in the art that many such incident response services are available for provision to an insured who is involved in an incident.

If it is determined in block 408 that the insured is not requesting an incident response service, then incident response service operations are ended in block 456. Otherwise, the parameters of the request are determined in block 410. As an example, the insured may request that only a roll-off wrecker be dispatched to the scene of the automobile accident, that a full-size rental vehicle be secured and likewise be delivered to the scene, and that lodging accommodations with a king-size bed be reserved. Accordingly, the insured's user and policy coverage information is retrieved from the user and insurance policy information repository in block 412. The corresponding coverage limits of the insured's policy are then compared to the incident response service parameters determined in block 410.

A determination is then made in block 416 whether the coverage limits of the insured's policy cover the cost of the requested incident response services with their associated parameters. If so, then the insurer makes arrangements for the provision of the requested incident response services, and assumes responsibility for their provision, in block 424. An incident report is then updated with the provided incident response services, along with their associated costs, and then stored in an incident information and claims repository in block 446. A determination is then made in block 448 whether to generate a claim against the insured's policy. It will be appreciated that not all requested incident response services will result in the generation of a claim against an insured's policy. For example, the insured may request the dispatch of emergency services if they have not been previously dispatched. As another example, the insured may request that lodging reservations be made on their behalf, which will be paid for out of pocket by the insured. If it is determined in block 448 to generate a claim against the insured's policy, then it is generated in block 450 and then stored in the incident information and claims repository in block 452. A determination is then made in block 454 whether another incident response service request is to be processed. If so, the process continues, proceeding with block 408. Otherwise, incident response service request operations are ended in block 456.

However, if it is determined in block 418 that the coverage limits of the insured's policy do not cover the cost of the requested incident response services with their associated parameters, then coverage gaps are determined and the insured is informed in block 418. A determination is then made in block 420 whether the insured wishes to adjust the parameters of the requested incident response services. As an example, the insured's policy may cover the full cost of a compact rental car. If the cost differential between a compact rental car and a full size vehicle is more than the insured is willing pay out of pocket, they may opt for the compact rental car. Accordingly, if it is determined in block 420 to adjust the parameters of the requested incident response services, then they are adjusted in block 422 and the process continues, proceeding with block 416.

However, if it is determined in block 420 that the parameters of the requested incident response services are not to be adjusted, then a determination is made in block 426 whether the insured commits to paying for the coverage gaps. If so, then a determination is made in block 430 whether financial account information associated with the insured in on file. If so, then a determination is made in block 432 whether the financial account information is to be used to cover the cost of the coverage gaps. If so, then the insurer makes arrangements for the provision of the requested incident response service(s) and uses the financial account information that is on file to pay for the coverage gaps on behalf of the insured in block 434. A determination is then made in block 448 whether to generate a claim against the insured's policy. If it is determined in block 448 to generate a claim against the insured's policy, then it is generated in block 450 and then stored in the incident information and claims repository in block 452. A determination is then made in block 454 whether another incident response service request is to be processed. If so, the process continues, proceeding with block 408. Otherwise, incident response service request operations are ended in block 456.

However, if it is determined in block 426 that the insured does not commit to pay for the coverage gaps, then a determination is made in block 428 whether the insured cancels their request for the response service(s). If so, then their request for the incident response service(s) are canceled in block 442. A determination is then made in block 454 whether another incident response service request is to be processed. If so, the process continues, proceeding with block 408. Otherwise, incident response service request operations are ended in block 456.

However, if it is determined in block 428 that the insured does not cancel their request, or in block 432 to not use financial account information that is on file, then a determination is made in block 436 whether the insured will provide alternative financial account information to pay for the coverage gaps. As an example, the insured may wish to provide a credit card number and associated expiry information to the insurer, who in turn uses the provided financial account information on behalf of the insured to make arrangements for the provision of incident response services. If it is determined in block 436 that the insured will not provide alternative financial account information to the insurer, then in block 444 the insurer makes arrangement for the provision of the requested incident response services and the insured assumes responsibility for making financial arrangements. A determination is then made in block 448 whether to generate a claim against the insured's policy. If it is determined in block 448 to generate a claim against the insured's policy, then it is generated in block 450 and then stored in the incident information and claims repository in block 452. A determination is then made in block 454 whether another incident response service request is to be processed. If so, the process continues, proceeding with block 408. Otherwise, Incident response service request operations are ended in block 456.

However, if it is determined in block 436 that the insured will provide alternative financial account information, then it is provided to the insurer in block 438. The insurer then makes arrangement for the provision of the requested incident response services and uses the provided financial account information to pay for the coverage gaps on behalf of the insured. A determination is then made in block 448 whether to generate a claim against the insured's policy. If it is determined in block 448 to generate a claim against the insured's policy, then it is generated in block 450 and then stored in the incident information and claims repository in block 452. A determination is then made in block 454 whether another incident response service request is to be processed. If so, the process continues, proceeding with block 408. Otherwise, incident response service request operations are ended in block 456.

Figure 5A:
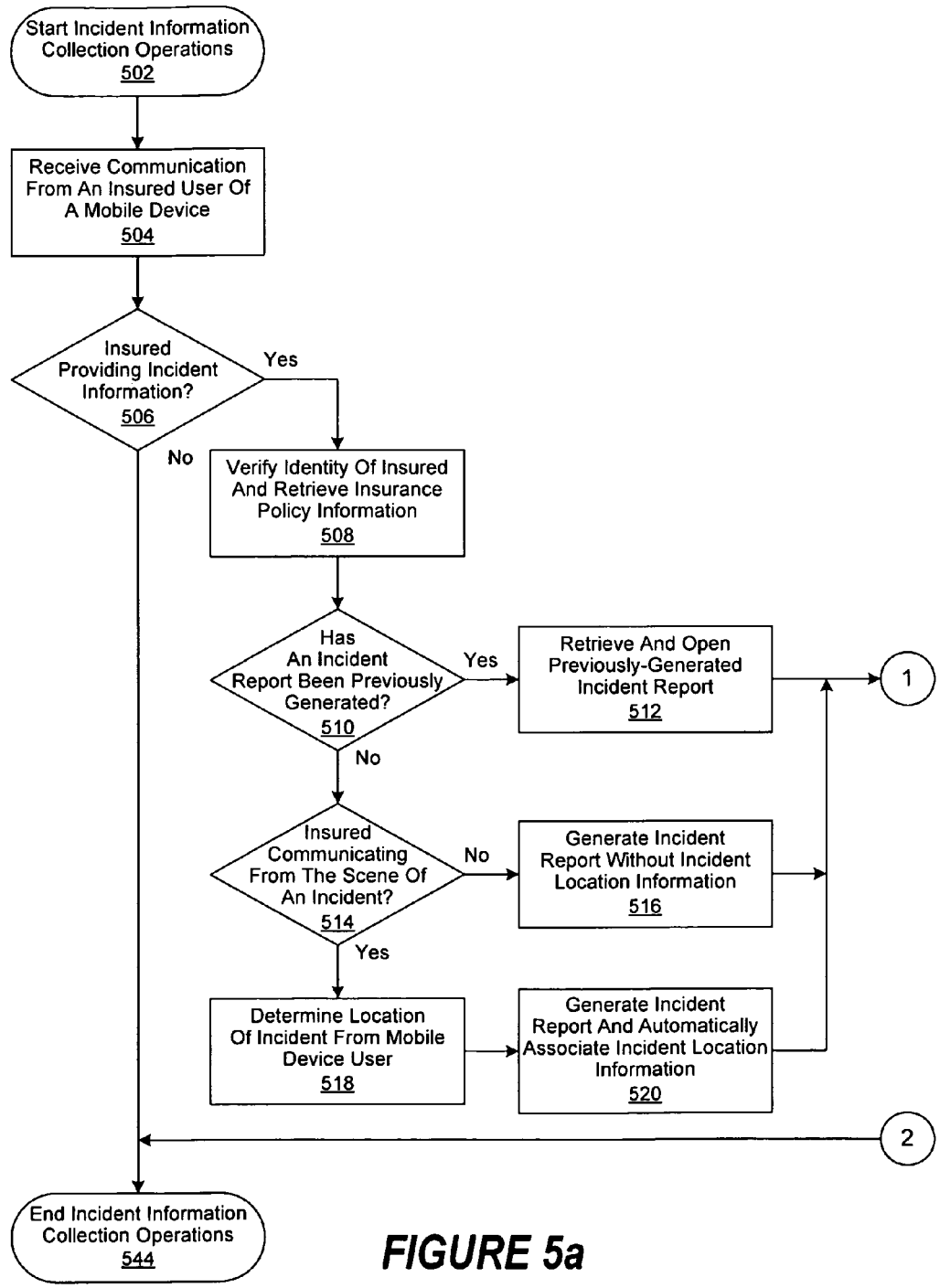
FIGS. 5a-b are a generalized flowchart of the operation of an incident information processing system as implemented with a mobile device to collect incident information.
Figure 5B:
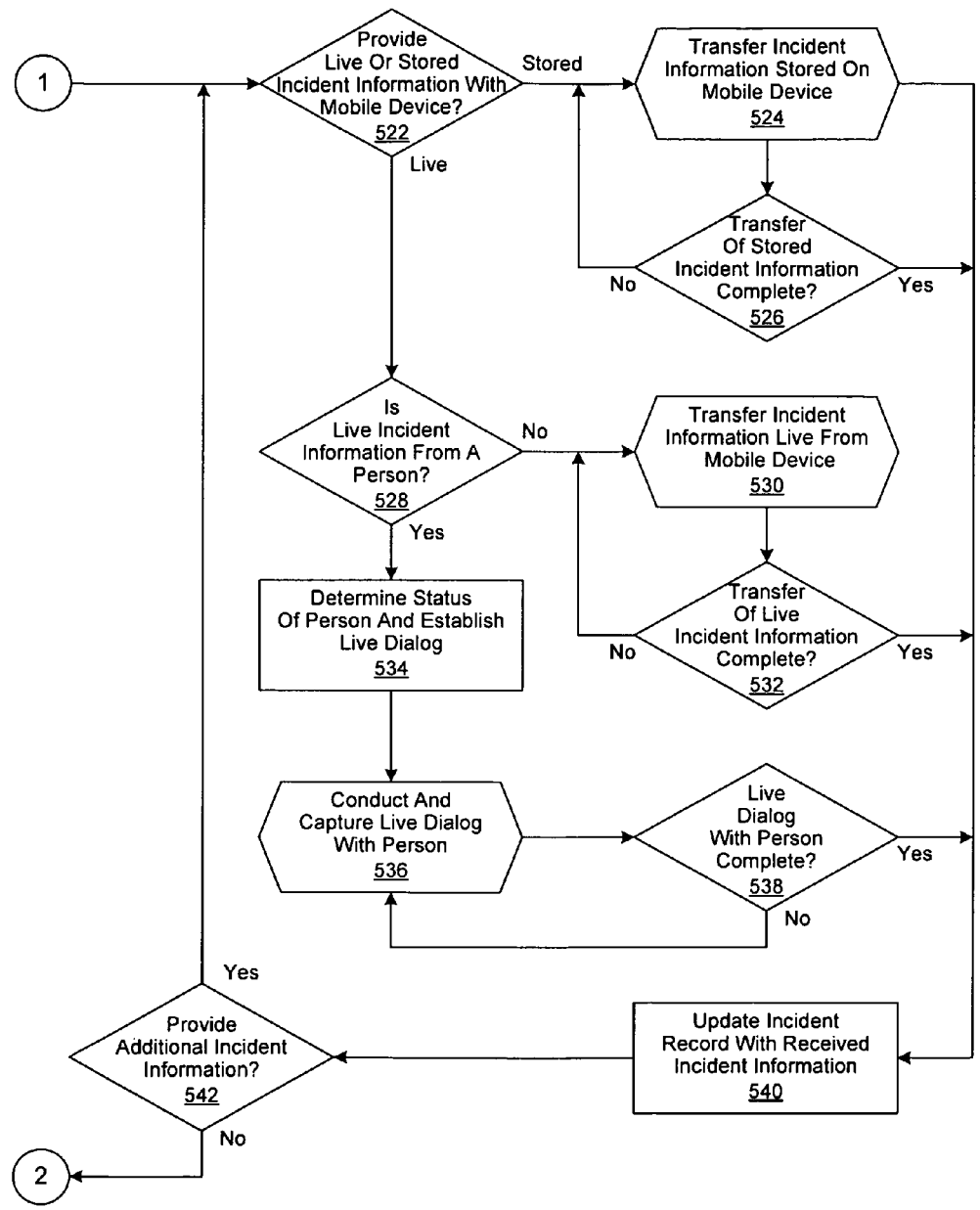
Figure 6A:
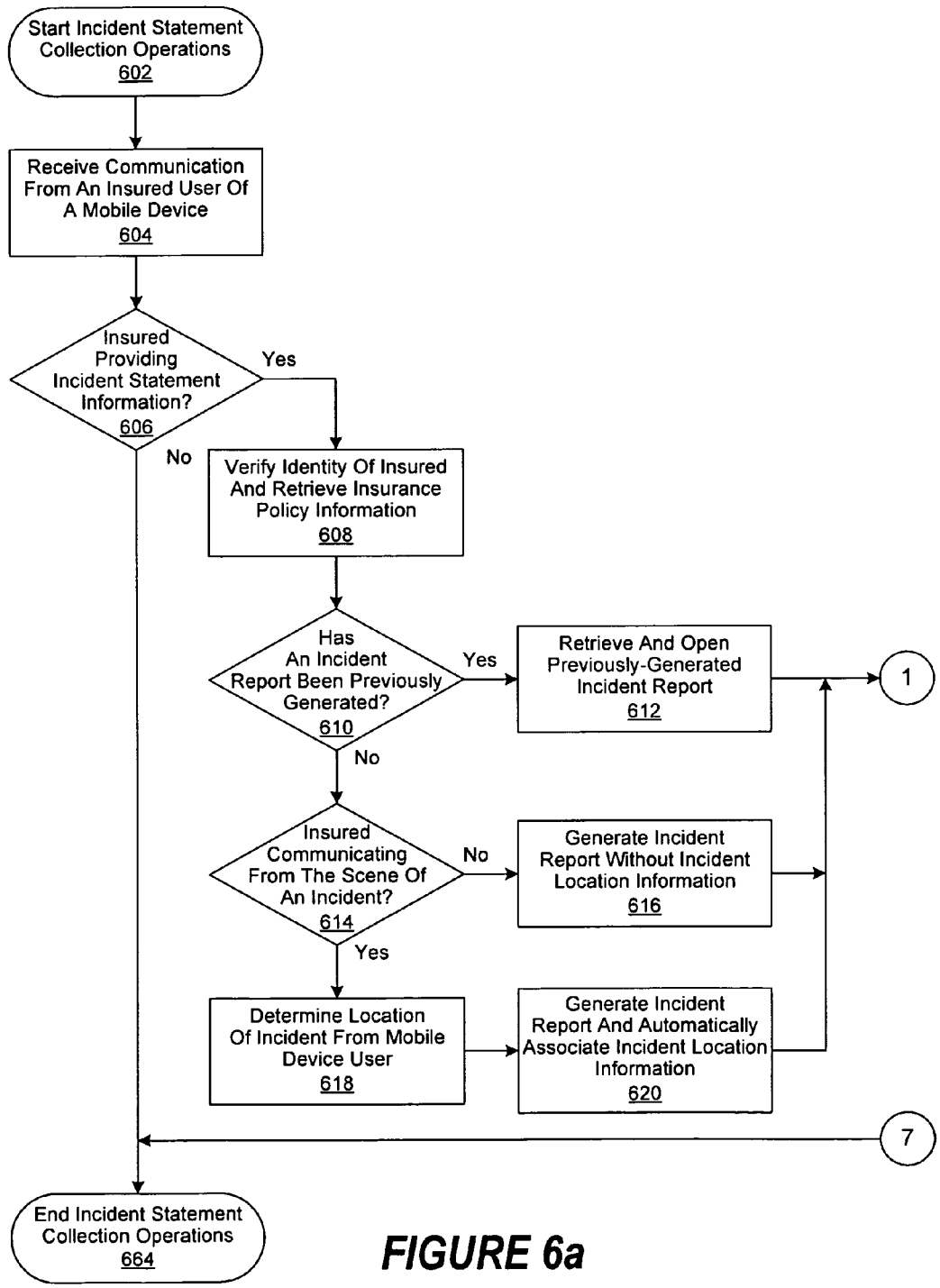
FIGS. 6a-d are a generalized flowchart of the operation of an incident information processing system as implemented with a mobile device to collect statements.
Figure 6B:
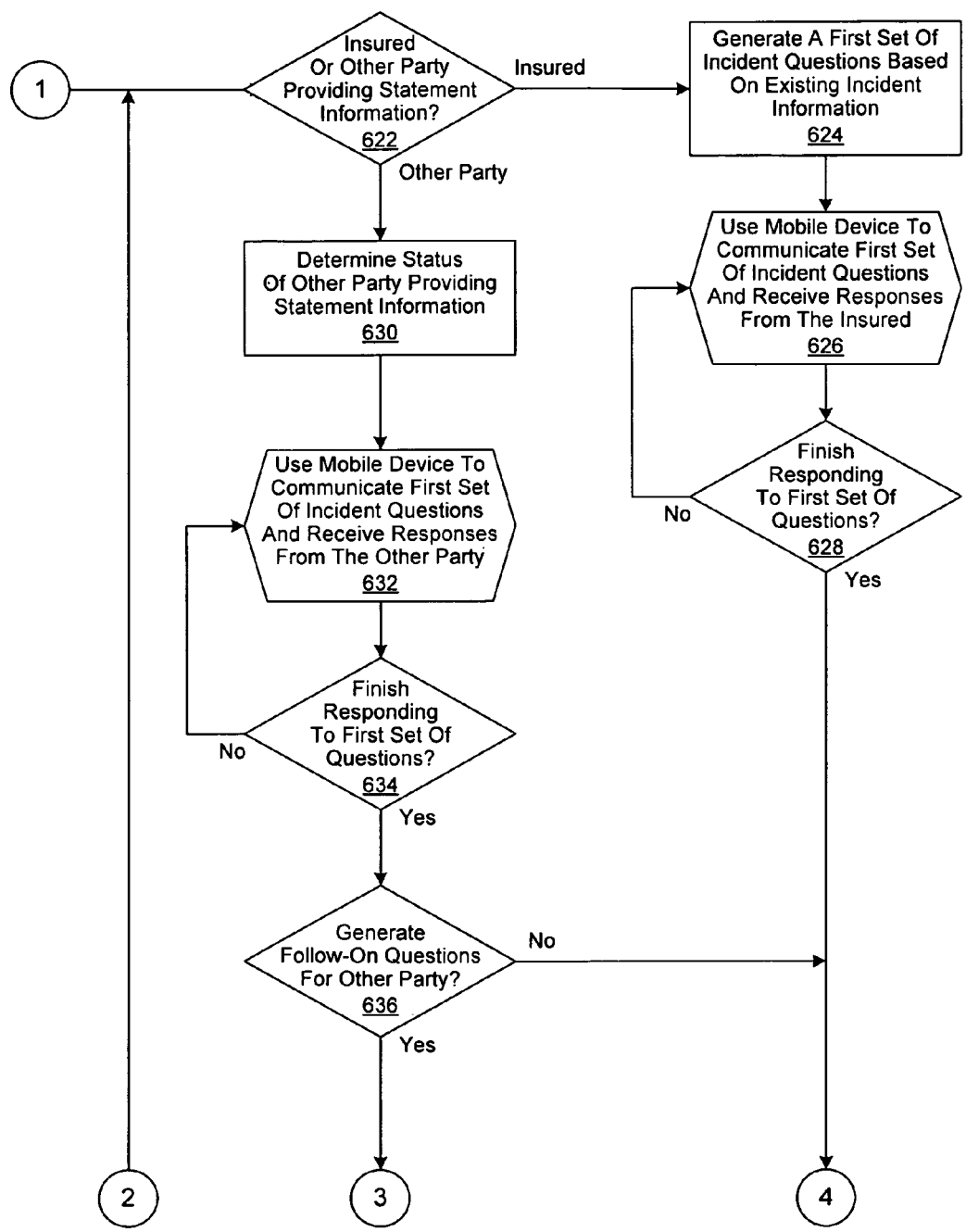
Figure 6C:
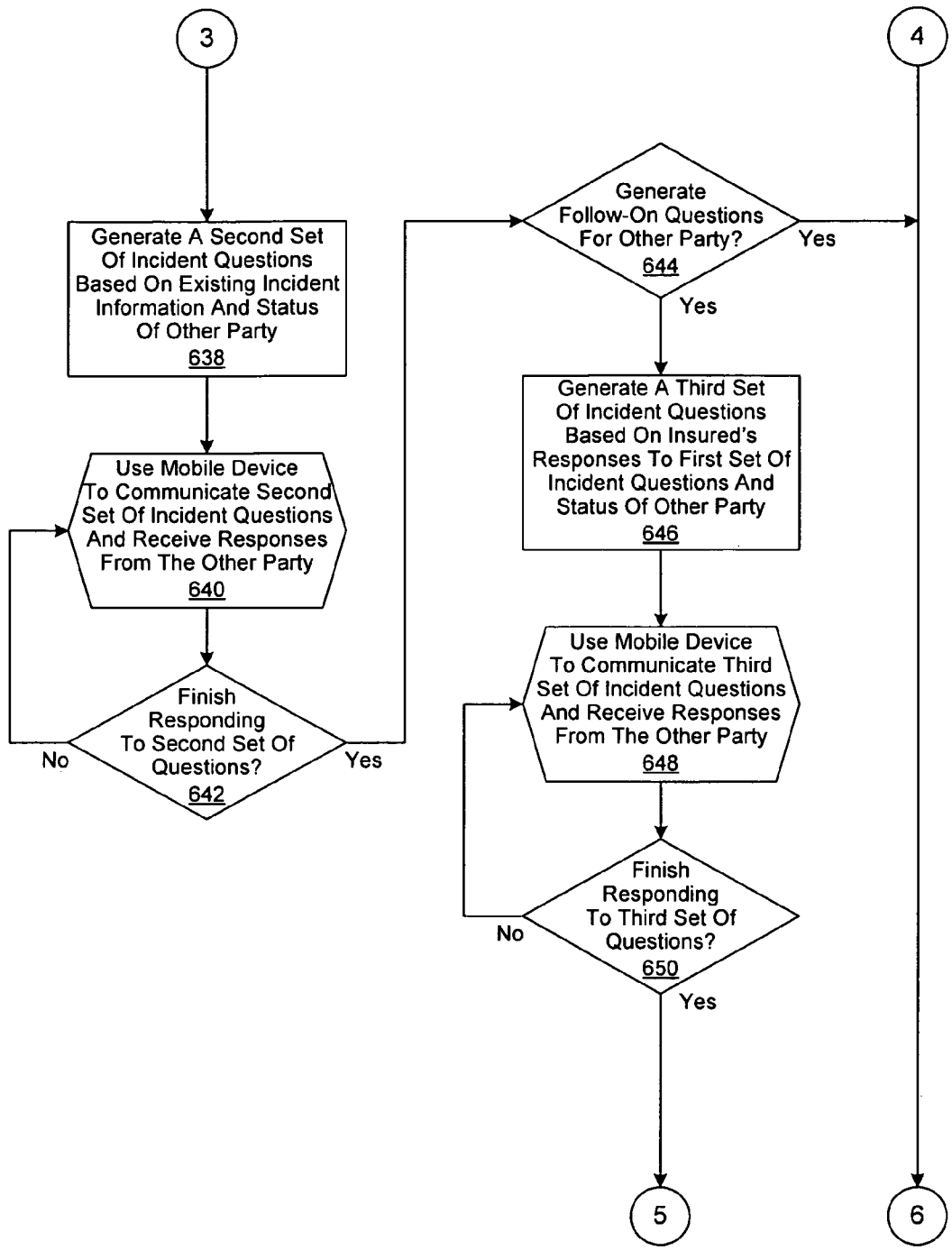
Figure 6D:
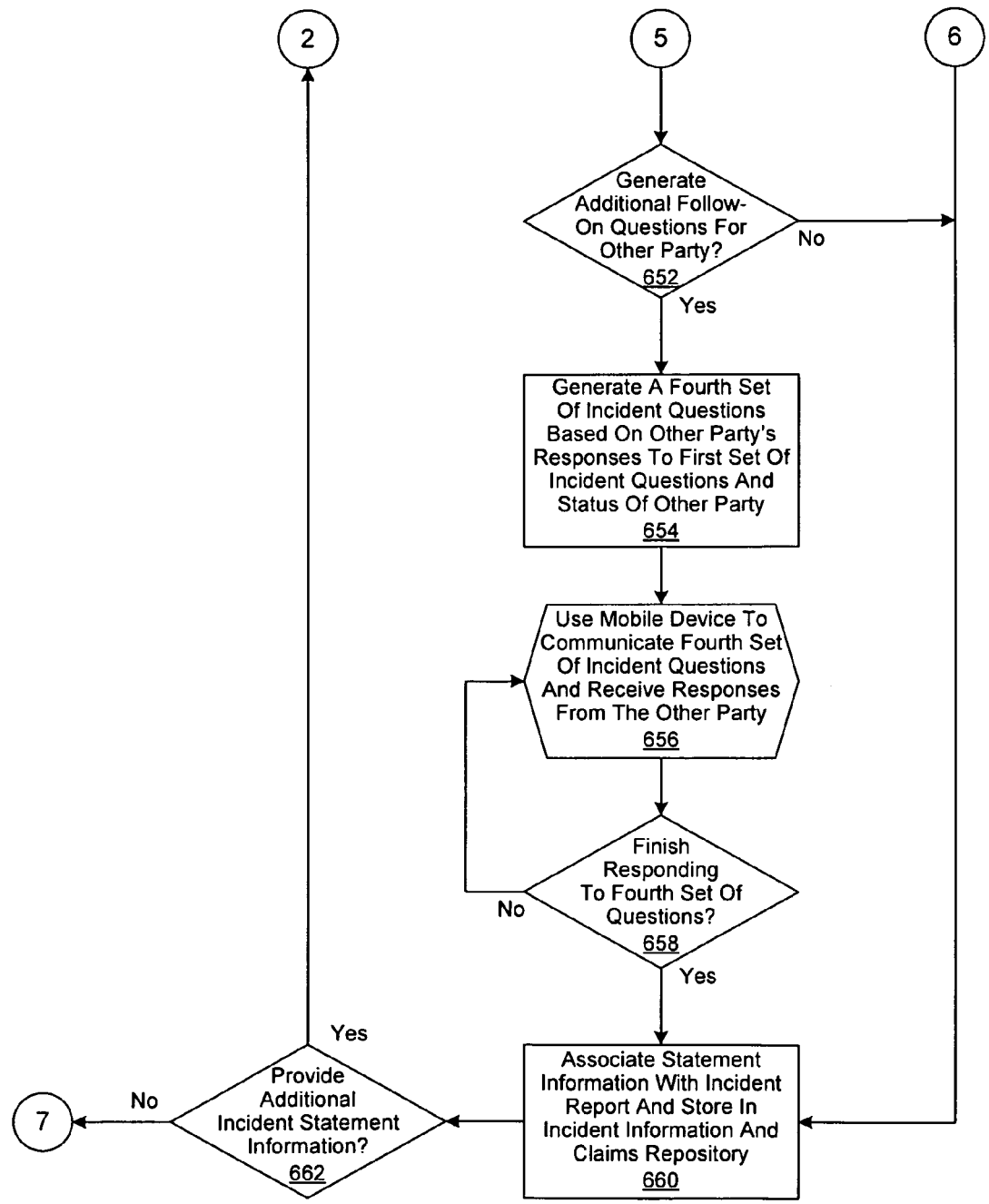

FIGS. 5a-b are a generalized flowchart of the operation of an incident information processing system as implemented with a mobile device in an embodiment to collect incident information. In this embodiment, incident information collection operations are begun in block 502, followed by the receipt of a communication originated by an insured user of a mobile device in block 504. A determination is then made in block 506 whether the insured is providing incident information. If not, then incident information collection operations are ended in block 544. Otherwise, the identity of the insured is verified and their associated insurance policy information is retrieved in block 508 as described in greater detail herein. A determination is then made in block 510 whether an incident report has been previously generated. If so, then the incident report is retrieved from the user and incident information repository and opened in block 512.

However, if it is determined in block 510 that an incident report has not previously been generated, then a determination is made in block 514 whether the insured is communicating from the scene of an incident. If not, then an incident report is generated without any associated incident location in block 516. However, if it is determined in block 514 that the insured is communicating from the scene of an incident, then the location of the insured user of the mobile device is determined in block 518 as described in greater detail herein. An incident report is then generated in block 520 and automatically associated with incident location information relating to the location of the incident.

Once an incident report is retrieved and opened in block 512, or generated in blocks 516 or 520, a determination is made in block 522 whether live or stored information will be provided by the mobile device. If it is determined in block 522 that the incident information is stored on the mobile device, then it is transferred to the incident information processing system in block 524.

In one embodiment, the stored incident information comprises location information relating to the incident, which is determined as described in greater detail herein. In another embodiment, the stored incident information comprises image information relating to the incident. In various embodiments, the image information may comprise a graphic image of the incident, a still image of the incident, a photographic image of the incident, or a video image of the incident. In another embodiment, the stored incident information comprises audio information relating to the incident. In various embodiments, the audio information comprises statements from an insured, a claimant, a witness, or a responder to the incident. In one embodiment, the incident information is transferred directly from the mobile device to the incident information processing system as described in greater detail herein. In another embodiment, the incident information is transferred through an intermediate device. As an example, video of the incident may be recorded by a digital video recorder that lacks communications capabilities. The digital video recorder is subsequently connected to a laptop computer through a universal serial bus (USB) connection and the video of the incident is transferred from the video recorder, through the laptop computer, then through a connection between the laptop computer and a WiFi network. A determination is then made in block 526 whether the transfer of stored incident information is complete. If not, the process continues, proceeding with block 524. Otherwise, the incident report is updated with the received incident information in block 540. A determination is then made in block 542 whether to provide additional incident information. If so, then the process continues, proceeding with block 522. Otherwise, incident information collection operations are ended in block 544.

However, if it is determined in block 522 that the incident information is being provided live from a mobile, device, then a determination is made in block 528 whether the live incident information is from a person. If not, then the live incident information is transferred to the incident information processing system in block 530. For example, an insured user of a mobile device may transfer live video from a camera phone equipped with video transmission capabilities. In one embodiment, the live incident information comprises location information relating to the incident, which is determined as described in greater detail herein. In another embodiment, the live incident information comprises image information relating to the incident. In various embodiments, the image information may comprise a graphic image of the incident, a still image of the incident, a photographic image of the incident, or a video image of the incident. A determination is then made in block 532 whether the transfer of live incident information is complete. If not, then the process is continued, proceeding with block 530. Otherwise, the incident report is updated with the received incident information in block 540. A determination is then made in block 542 whether to provide additional incident information. If so, then the process continues, proceeding with block 522. Otherwise, incident information collection operations are ended in block 544.

However, if it is determined in block 528 that the provider of live incident information is a person, then the status of the person is determined and a dialog is established in block 534. In one embodiment, the live incident information comprises audio dialog information relating to the incident. In various embodiments, the audio dialog information comprises statements from a person whose status may be an insured, a claimant, a witness, or a responder to the incident. A live dialog with the person is then conducted and captured by the incident information processing system in block 536. A determination is then made in block 538 whether the dialog with the person is complete. If not, then the process is continued, proceeding with block 536. Otherwise, the incident report is updated with the received incident information in block 540. A determination is then made in block 542 whether to provide additional incident information. If so, then the process continues, proceeding with block 522. Otherwise, incident information collection operations are ended in block 544.

FIGS. 6a-d are generalized flowcharts of the operation of an incident information processing system as implemented with a mobile device in an embodiment to collect statements. In this embodiment, incident statement collection operations are begun in block 602, followed by the receipt of a communication originated by an insured user of a mobile device in block 604. A determination is then made in block 606 whether the insured is providing incident information. If not, then incident information collection operations are ended in block 664. Otherwise, the identity of the insured is verified and their associated insurance policy information is retrieved in block 608 as described in greater detail herein. A determination is then made in block 610 whether an incident report has been previously generated. If so, then the incident report is retrieved from the user and incident information repository and opened in block 612.

However, if it is determined in block 610 that an incident report has not previously been generated, then a determination is made in block 614 whether the insured is communicating from the scene of an incident. If not, then an incident report is generated without any associated incident location in block 616. However, if it is determined in block 614 that the insured is communicating from the scene of an incident, then the location of the insured user of the mobile device is determined in block 618 as described in greater detail herein. An incident report is then generated in block 620 and automatically associated with incident location information relating to the location of the incident.

Once an incident report is retrieved and opened in block 612, or generated in blocks 616 or 620, a determination is made in block 622 whether the insured or another party is providing the statement information. If it is determined in block 622 that the insured is providing the statement information, then a first set of incident questions, based on existing incident information, is generated by the incident information processing system in block 624. The mobile device is then used to convey the first set of questions to the insured and receive their responses in block 626. A determination is then made in block 628 whether the insured has finished responding to the first set of questions. If not, the process continues, proceeding with block 626. Otherwise, the statement information resulting from the insured's responses to the first set of questions are associated with the incident report and stored in the incident information and claims repository in block 660. A determination is then made in block 662 whether additional statement information is to be provided. If so, then the process continues, proceeding with block 622. Otherwise, incident statement collection operations are ended in block 664.

However, if it is determined in block 622 that the incident statement information is to be provided by another party, then the status of the other party is determined in block 630. In various embodiments, the status of the other party providing the incident statement information may be an insured, a claimant, a witness, or a responder to the incident. The mobile device is then used to convey the first set of questions to the other party and receive their responses in block 632. A determination is then made in block 634 whether the other party has finished responding to the first set of questions. If not, the process continues, proceeding with block 632. Otherwise, a determination is made in block 636 whether to generate a second set of questions for the other party. If not, then the statement information resulting from the other party's responses to the first set of questions are associated with the incident report and stored in the incident information and claims repository in block 660. A determination is then made in block 662 whether additional statement information is to be provided. If so, then the process continues, proceeding with block 622. Otherwise, incident statement collection operations are ended in block 664.

However, if it is determined in block 636 to generate a second set of questions for the other party, then a second set of questions, based on existing incident information and the status of the other party, are generated in block 638. As an example, if the status of the other party is a claimant, questions relating to the nature of the claim may be generated. As another example, if the status of the other party is a witness, questions relating to their location prior to the occurrence of the incident may be generated. It will be appreciated that many such questions are possible based on the status of the other party. The mobile device is then used to convey the second set of questions to the other party and receive their responses in block 640. A determination is then made in block 642 whether the other party has finished responding to the second set of questions. If not, the process continues, proceeding with block 640. Otherwise, a determination is made in block 644 whether to generate follow-on questions for the other party. If not, the statement information resulting from the other party's responses to the first and second sets of questions are associated with the incident report and stored in the incident information and claims repository in block 660. A determination is then made in block 662 whether additional statement information is to be provided. If so, then the process continues, proceeding with block 622. Otherwise, incident statement collection operations are ended in block 664.

However, if it is determined in block 644 to generate follow-on questions for the other party, then a third set of questions, based the insured's responses to the first set of questions and the status of the other party, are generated in block 646. The mobile device is then used to convey the third set of questions to the other party and receive their responses in block 648. A determination is then made in block 650 whether the other party has finished responding to the third set of questions. If not, the process continues, proceeding with block 648. Otherwise, a determination is made in block 652 whether to generate additional follow-on questions for the other party. If not, the statement information resulting from the other party's responses to the first, second and third sets of questions are associated with the incident report and stored in the incident information and claims repository in block 660. A determination is then made in block 662 whether additional statement information is to be provided. If so, then the process continues, proceeding with block 622. Otherwise, incident statement collection operations are ended in block 664.

However, if it is determined in block 652 to generate additional follow-on questions for the other party, then a fourth set of questions, based on the other party's responses to the first set of questions and the status of the other party, is generated in block 654. The mobile device is then used to convey the fourth set of questions to the other party and receive their responses in block 656. A determination is then made in block 658 whether the other party has finished responding to the fourth set of questions. If not, the process continues, proceeding with block 656. Otherwise, the statement information resulting from the other party's responses to the first, second, third, and fourth sets of questions are associated with the incident report and stored in the incident information and claims repository in block 660. A determination is then made in block 662 whether additional statement information is to be provided. If so, then the process continues, proceeding with block 622. Otherwise, incident statement collection operations are ended in block 664.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A system, comprising processing logic operable to:
   receive from a mobile device, wirelessly communicated incident information of an incident from said mobile device, wherein said incident information comprises audio information and non-audio mobile device identification information;
   determine a type of communication protocol through which the incident information is being transmitted, wherein the communication protocol comprises one of a first type and a second type;
   identify a user of said mobile device through utilization of a first process if the non-audio mobile device identification information is of the first type and through utilization of a second process if the non-audio mobile identification information is of the second type;
   correlate said incident information with an identity of the user of said mobile device, wherein said user is an insured of an insurance policy;
   retrieve insurance policy information associated with said user from a database; and
   use said incident information and said insurance policy information to generate incident claim information.

2. The system of claim 1, wherein said incident information comprises location information that is used to determine a location of the incident.

3. The system of claim 1, wherein said incident information comprises image information, wherein said image information comprises at least one of:
   a graphic image of an incident;
   a still image of an incident;
   a photographic image of an incident; or
   a video image of an incident.

4. The system of claim 1, wherein said audio information comprises at least one of:
   a statement from an insured;
   a statement from a claimant;
   a statement from a witness; or
   a statement from a responder to an incident.

5. The system of claim 1, wherein said claim information is used to initiate the generation of an insurance claim, wherein said claim is against said insurance policy.

6. A computer-implementable method for processing incident information, comprising:
   receiving from a mobile device incident information of an incident, wherein said incident information comprises audio information and non-audio mobile device identification information;
   determining a type of communication protocol through which the incident information is being transmitted, wherein the communication protocol comprises one of a first type and a second type;

identifying a user of said mobile device through utilization of a first process if the communication protocol is of the first type and a second process if the communication protocol is of a second type;

correlating said incident information with an identity of the user of said mobile device, wherein said user is an insured of an insurance policy; and retrieving insurance policy information associated with said user from a database; and using said incident information and said insurance policy information to generate incident claim information.

7. The method of claim 6, wherein said incident information comprises location information that is used to determine a location of an incident.

8. The method of claim 6, wherein said incident information comprises image information, wherein said image information comprises at least one of:
   a graphic image of an incident;
   a still image of the incident;
   a photographic image of the incident; or
   a video image of the incident.

9. The method of claim 6, wherein said audio information comprises at least one of:
   a statement from an insured;
   a statement from a claimant;
   a statement from a witness; or
   a statement from a responder to an incident.

10. The method of claim 6, wherein said claim information is used to initiate generation of an insurance claim resulting from said incident, wherein said claim is against said insurance policy.

11. A non-transitory computer-usable medium embodying computer program code, the computer program code comprising computer executable instructions configured for:
   receiving from a mobile device, wirelessly communicated non-audio mobile device identity information;
   determining a type of communication protocol through which the non-audio mobile information is being transmitted, wherein the communication protocol comprises one of a first type and a second type;
   using a first process to determine an identity of a user of the mobile device if the communication protocol is of the first type and using a second process to determine an identity of the user if the communication protocol is of a second type;
   retrieving user information associated with said user from a database;
   receive wirelessly communicated incident information from said user using said mobile device;
   determine a location of said mobile device; and
   process said user information, incident information and location information to generate an incident response action.

12. The computer usable medium of claim 11, wherein said incident information comprises location information that is used to determine a location of an incident.

13. The computer usable medium of claim 11, wherein said incident information comprises image information, wherein said image information comprises at least one of:
   a graphic image of an incident;
   a still image of the incident;
   a photographic image of the incident; or
   a video image of the incident.

14. The computer usable medium of claim 11, wherein said incident information comprises audio information, wherein said audio information comprises at least one of:
   a statement from an insured;
   a statement from a claimant;
   a statement from a witness; or
   a statement from a responder to an incident.

15. The computer usable medium of claim 11, wherein said claim information is used to initiate the generation of an insurance claim resulting from an incident, wherein said claim is against said insurance policy.

\* \* \* \* \*